Jan. 25, 1944.    B. CHANCE    2,340,175
AUTOMATIC STEERING
Filed Jan. 18, 1940    3 Sheets-Sheet 1

Inventor:-
Britton Chance
by his Attorneys
Howson & Howson

Jan. 25, 1944.  B. CHANCE  2,340.175

AUTOMATIC STEERING

Filed Jan. 18, 1940   3 Sheets-Sheet 2

Inventor:-
Britton Chance
by his Attorneys
Howson & Howson

Jan. 25, 1944.   B. CHANCE   2,340,175
AUTOMATIC STEERING
Filed Jan. 18, 1940   3 Sheets-Sheet 3
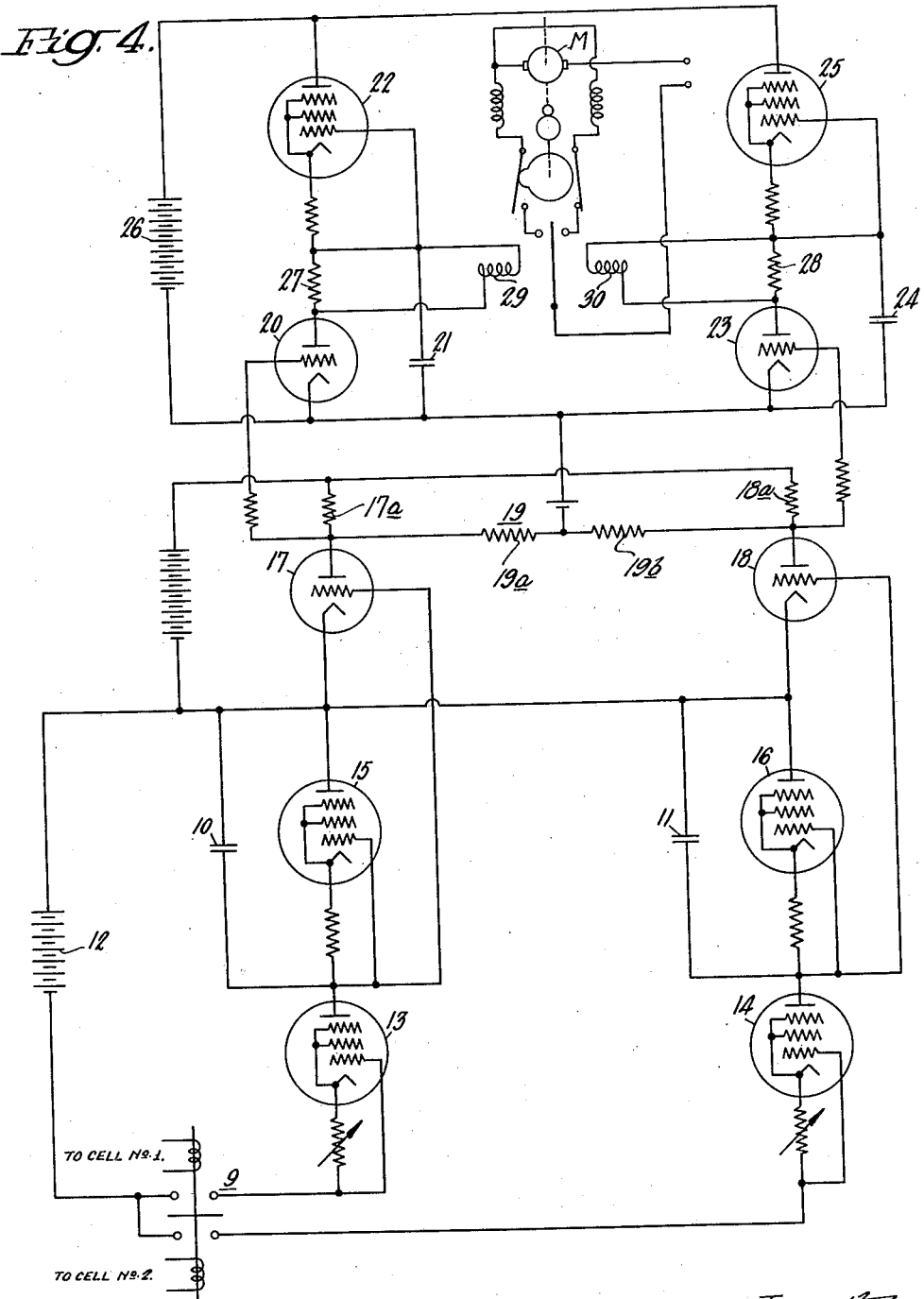
Inventor:-
Britton Chance
by his Attorneys
Howson & Howson Patented Jan. 25, 1944

2,340,175

UNITED STATES PATENT OFFICE 2,340,175

AUTOMATIC STEERING

Britton Chance, Mantoloking, N. J.

Application January 18, 1940, Serial No. 314,559
In Great Britain January 19, 1939

14 Claims. (Cl. 114—144)

This invention relates to automatic steering gear for steering dirigible craft having rudders. The invention is generally applicable to steering gear of various kinds and it is equally applicable, for example, to gears of the kind employing a beam of radiant energy, orientated with respect to the craft, and devices sensitive to said radiant energy adapted to control operation of the rudder motor, and to gears of the kind employing a gyroscopic device adapted to control the operation of the rudder motor.

It is well known that any sizable craft equipped with an automatic steering system tends to follow a certain path which is substantially a sinusoidal curve of low frequency. The frequency and other characteristics of this sinusoidal path are dependent upon the structural character of the craft, the character of its propulsion system, and the character of its steering gear. Under given conditions of these factors, and in the absence of external forces tending to move the craft in azimuth, the craft will follow a substantially sinusoidal path or curve having a particular low frequency.

In the presence of external forces due to wind or water, however, the path of the craft assumes a complex nature and comprises two components, one the sinusoidal component of relatively low frequency and the other an irregular component dependent on the weather conditions and occurring at a relatively higher frequency. I have found that the motion of a craft under such conditions, if plotted, is in the form of a substantially sinusoidal curve of low frequency upon which the said irregular component is superimposed, and therefore I choose to term the composite yaw of the craft "modulated yaw." For convenience, the modulation component may be termed the "secondary yaw." The secondary yaw varies in proportion to the weather condition. The usual rudder operating mechanisms are incapable of correcting this secondary yaw which seriously affects the automatic steering system.

The principal object of this invention, which is based upon the above-mentioned discovery, is to provide means for substantially eliminating the effect of modulated yaw.

The invention may be clearly understood by reference to the accompanying drawings, in which:

Fig. 4 illustrates another form of device for the same purpose;

Figure 1:
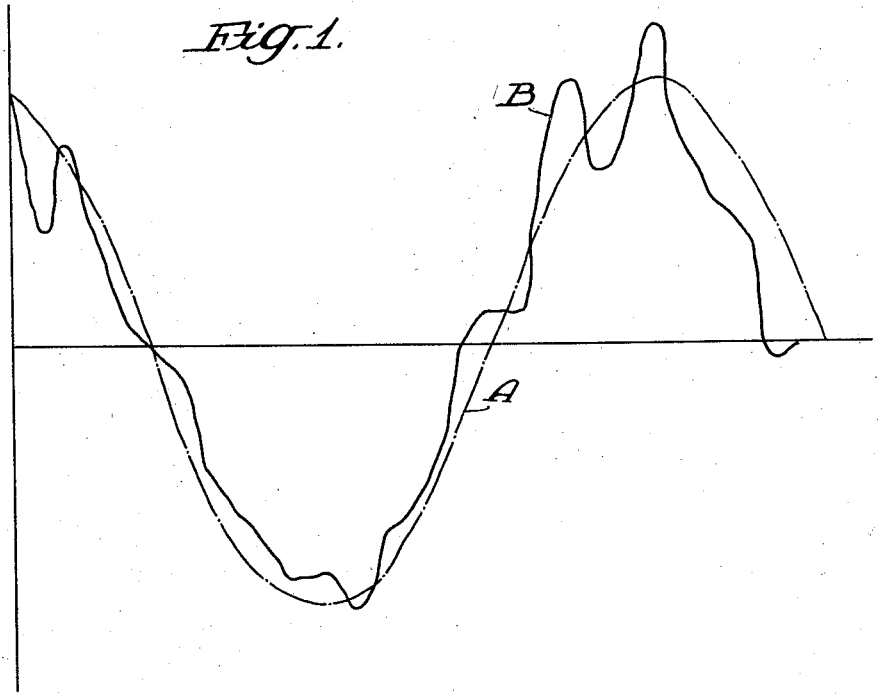
Fig. 1 is a graphic illustration of the modulated yaw incurred in a specific instance.

Referring to Fig. 1, the curve A represents ideally the sinusoidal yaw of the craft, while curve B is a plotted graph of the actual complex yaw, in one instance comprising the fundamental component and the secondary component. As is well known to those skilled in the art, it is necessary in automatic steering to apply rudder action known as "follow-up rudder," and in order to steer accurately, especially in heavy weather, it is essential that the rudder be given a relatively great throw, known as "initial rudder," at the peak of the fundamental yaw, or in other words at the precise time that the direction of yawing motion changes. Follow-up rudder, which may also be termed normal rudder, is the amount of applied rudder which is proportional to the deviation of the craft from its set course. Under ideal conditions, this alone would be sufficient. Initial rudder is that in excess of follow-up rudder, applied at or near a yaw peak to oppose the next yaw. It may also be termed anticipatory rudder. Conventional automatic steering systems have means for applying follow-up rudder and also have provision for applying initial rudder.

As may be seen from Fig. 1, the secondary yaw gives rise to improper application of initial rudder, since the initial rudder device responds to the secondary changes of direction represented by the secondary yaw. As mentioned above, this interferes seriously with accurate steering.

According to the present invention, novel means are provided for effecting application of initial rudder in response to the fundamental yaw component substantially to the exclusion of the secondary component, thereby substantially eliminating the above-mentioned undesirable effect of the secondary component.

According to one form of the invention shown schematically in Fig. 2, there is provided a conventional automatic steering system C having provision for applying follow-up rudder, and there is further provided an initial rudder device D which may take the forms described hereinafter, and the effects of the two devices C and D are combined in a conventional differential gear drive E arranged to actuate the rudder R. The device C may be any known device, such as that shown in my prior Patent No. 2,182,717, granted December 5, 1939, arranged to provide follow-up rudder only.

Figure 3:
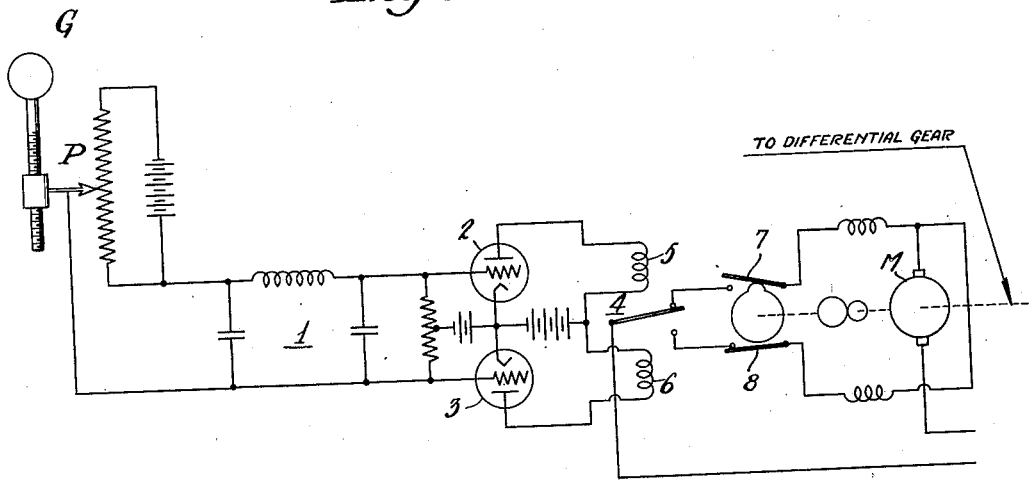
Fig. 3 illustrates one form of device which may be employed in the apparatus of Fig. 2 for eliminating the effects of the secondary yaw.

In Fig. 3, there is illustrated one form of the device D. There is shown schematically a gyro-repeater G, such as commonly employed in steering systems arranged to operate a potentiometer P through a suitable drive to produce a fluctuating voltage whose amplitude varies according to the craft's complex yaw. This voltage is applied to a discriminator 1 in the form of a low-pass electrical filter which passes current at the relatively low frequency of the fundamental yaw, but which presents high impedance to the passage of current at the relatively high frequency of the secondary yaw. Thus, the device is a frequency selective device which discriminates against the secondary yaw and produces an output voltage which follows the fundamental yaw.

Figure 2:
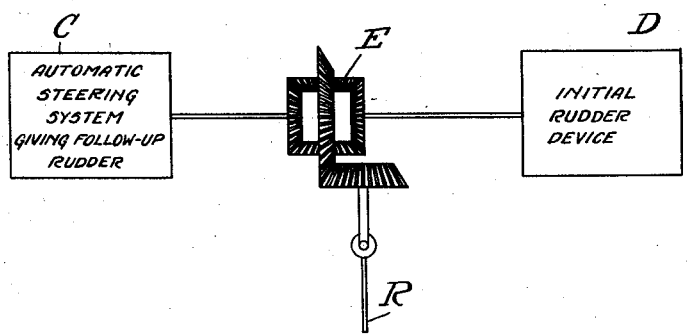
Fig. 2 is a schematic illustration of apparatus according to the invention.

This voltage is applied to a differential control circuit comprising tubes 2 and 3, which controls a double acting relay 4 which in turn controls the motor M whose shaft is connected to the differential gear E of Fig. 2. As illustrated, the windings 5 and 6 of the double acting relay may be connected in the output circuits of the tubes 2 and 3. The relay controls the energizing circuits of the multi-field reversible motor M which produces the initial rudder action.

The motor is provided with suitable limit switches 7 and 8 which may take the form of cam-operated switches, as illustrated, the operating cams of which are driven by the motor shaft through suitable gearing.

When the device of Fig. 3 is embodied in the apparatus of Fig. 2, the devices C and D respond to the yawing motion of the craft, and together these devices control the rudder action. The device C provides follow-up rudder in known manner, while the device D provides initial rudder in response to the fundamental yaw component only. The additive effect is transmitted to the rudder through the differential gear E.

It will be apparent that the electrical filter of Fig. 3 may be replaced by an equivalent mechanical filter.

In Fig. 4, there is illustrated a photocell-electronic embodiment of the initial rudder device D. In this instance, a double acting relay 9 is controlled by photocell circuits of known form in response to the craft's motion. The relay 9 controls the selective charging of condensers 10 and 11 from source 12 through pentodes 13 and 14 which cause the charging to be at a constant rate. The charged condenser is continually discharged at a constant rate by pentode 15 or 16. The difference in potential between the two condensers is an accurate representation of the craft's motion. The circuit element should be so chosen in any instance that the difference in potential reaches a maximum substantially at the peak of the yaw in either direction.

The condenser voltages are applied to the grids of triodes 17 and 18 whose plate loads 17a and 18a are connected in a bridge circuit 19 including resistors 19a and 19b.

Associated with each of the triodes 17 and 18 is a sawtooth wave generator. One generator comprises a gas triode 20, condenser 21, and pentode 22. Likewise, the other generator comprises a gas triode 23, condenser 24, and pentode 25. Since both these devices are similar, a consideration of one will suffice. The condenser 21, for example, is charged from source 26 at a constant rate through pentode 22. When the gas triode 20 fires, it discharges the condenser. Thus, there is produced a voltage across resistor 27.

Similarly, the other sawtooth generator is adapted to produce a voltage across the resistor 28.

Now the two devices are arranged so that they will be fired by the control circuits substantially at the true peak of the yaw in one direction or the other. That is to say, the peak yaw in one direction will fire triode 20, while the peak yaw in the other direction will fire the triode 23. This result is accomplished by the connections illustrated, the voltage across resistor 19a being applied to the input of triode 20, while the voltage across resistor 19b is applied to triode 23. It will be seen that the voltage across 19a will be a maximum at the peak yaw in one direction, while the voltage across 19b will be a maximum at the peak yaw in the opposite direction. The maximum voltage, in each instance, fires the associated gas triode. When triode 20 fires, the voltage across resistor 27 energizes winding 29 of a double acting relay, while when triode 23 fires, the voltage across resistor 28 energizes relay winding 30. The relay energizes the initial rudder motor M in one direction or the other.

Thus, when the device of Fig. 4 is employed as the device D in Fig. 2, initial rudder is applied only at the peak of the yaw in either direction. In effect, this device discriminates against the modulation or secondary yaw and responds only to the fundamental yaw of the craft.

Figure 5:
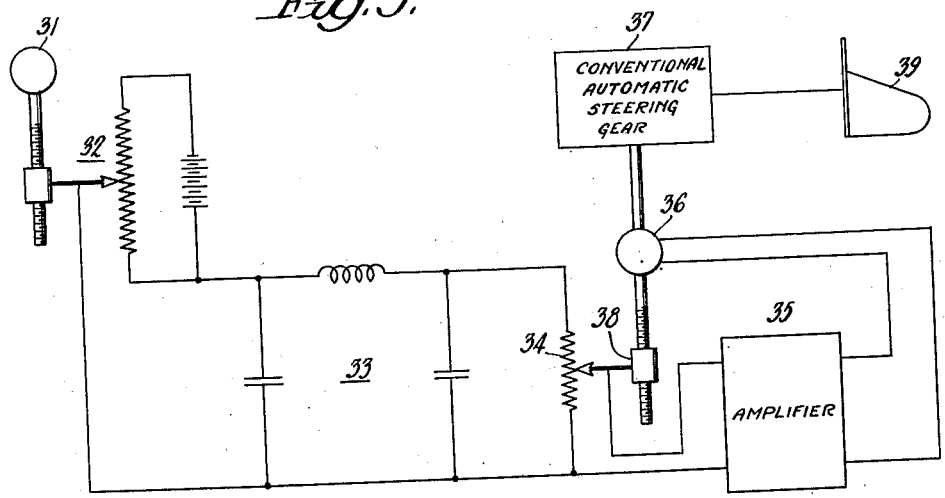
Fig. 5 is a diagrammatic illustration of a different form of the invention.

In Fig. 5, there is illustrated a different form of the invention. In this instance, a gyro-repeater 31 drives a potentiometer 32 to produce a varying voltage which is applied to a low pass filter 33, as in the device of Fig. 3. The output of the filter is applied to a potentiometer 34 and the voltage variation thereacross is amplified in a conventional amplifier 35 which is normally quiescent. The output voltage of the amplifier is applied to a repeater motor 36. The motor operates a conventional steering system 37 which may contain a contactor or an electro-optical device actuated by the motor. The motor 36 also operates a rebalancing drive 38 to restore the quiescent condition of the amplifier. The steering system 37 operates the rudder 39 to produce initial rudder in known manner.

Thus, in this instance, the modulation or secondary component of the craft's yaw is removed by the filter and the fundamental component is utilized to drive a steering system of known character. Consequently, initial rudder is applied in response to the true peak yaw.

Figure 6:
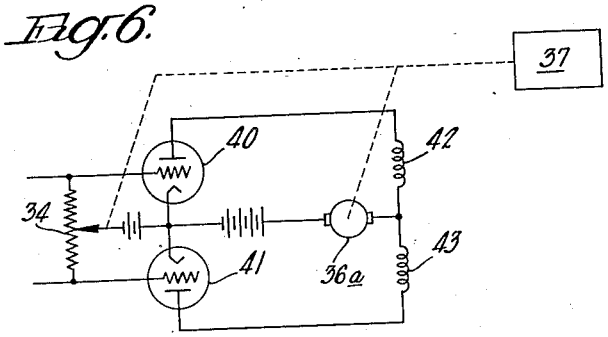
Fig. 6 illustrates a particular form of amplifier which may be employed in the system of Fig. 5.

In Fig. 6, there is illustrated a particular form of balanced amplifier which may be used in the system of Fig. 5. The tubes 40 and 41 control the energization of the field windings 42 and 43 of motor 36a. The motor drives the movable contact arm to effect rebalancing and also drives the steering gear 37.

While certain embodiments of the invention have been illustrated and described for the purpose of disclosure, it will be apparent that other forms of the invention are possible without departing from its spirit and scope.

I claim:

1. In an automatic steering system for a dirigible craft, means responsive to the yawing motion of the craft for producing voltages whose magnitudes vary according to such motion, an impulse generating circuit comprising gas tubes adapted to be fired by said voltages when the latter attain substantially their peak amplitude, and means operable by said circuit for controlling the steering of said craft.

2. In an automatic steering system for a dirigible craft, means responsive to the yaw of the craft for producing a variable voltage whose amplitude varies according to the craft's yaw, means including a gas tube adapted to be triggered by said voltage only when it reaches its maximum amplitude, to produce a second voltage, means responsive to said second voltage to produce a control action, and means for utilizing said control action to steer the craft.

3. In an automatic steering system for a dirigible craft, means responsive to the yaw of the craft for producing a variable voltage whose amplitude varies according to the craft's yaw, a condenser and charging means therefor, means responsive to said voltage for discharging said condenser when the voltage amplitude corresponds to the peak of the craft's yaw, means responsive to the discharge of said condenser for producing a control action, and means for utilizing said control action to steer the craft.

4. In an automatic steering system for a dirigible craft, means responsive to the craft's yaw in one direction for producing a first unidirectional voltage of varying amplitude, means responsive to the craft's yaw in the opposite direction for producing a second unidirectional voltage of varying amplitude, means for opposing said voltages to one another to obtain a resultant voltage whose amplitude and polarity at any instant corresponds to the craft's yaw, a pair of condensers and charging means therefor, means responsive to the amplitude and polarity of said resultant voltage for selectively discharging said condensers, and means responsive to the discharge of said condensers for producing a steering action.

5. In combination, a dirigible craft equipped with an automatic steering system which tends to direct the craft along a substantially sinusoidal path or curve of low frequency, the extraneous influences on said craft tending to produce secondary movements thereof of higher frequency superimposed on the primary movement of the craft, means responsive to the movements of the craft including said higher frequency movements, means operable by said first-named means to actuate the craft's rudder, and means for continuously rejecting the influences of said higher frequency movements and preventing the same from affecting said rudder actuation.

6. In combination, a dirigible craft equipped with an automatic steering system which tends to direct the craft along a substantially sinusoidal path or curve of low frequency, the extraneous influences on said craft tending to produce secondary movements thereof of higher frequency superimposed on the primary movement of the craft, means for producing an electrical voltage corresponding to the complex movement of the craft, means for eliminating the higher frequency components of said voltage corresponding to the secondary movements of the craft, and means operable by said voltage to actuate the craft's rudder.

7. In combination with a dirigible craft, means for producing movement of the craft's rudder proportional to the deviation of the craft from its course and in a direction to maintain said course, whereby the craft tends to travel along a substantially sinusoidal path or curve of low frequency, the extraneous influences on said craft tending to produce secondary movements thereof of higher frequency superimposed on the primary movement of the craft, means responsive to the complex movement of the craft for producing rudder movement in excess of the aforementioned rudder movement in response to reversals in direction of the craft's yawing motion, and means for eliminating the effects of the aforementioned higher frequency movements upon said last-named means.

8. In combination with a dirigible craft, an automatic steering system adapted to produce movement of the craft's rudder proportional to the deviation of the craft from its course and in a direction to maintain said course, whereby the craft tends to travel along a substantially sinusoidal path or curve of low frequency, the extraneous influences on said craft tending to produce secondary movements thereof of higher frequency superimposed on the primary movement of the craft, a device responsive to the movements of the craft for producing a mechanical movement, means included in said device for eliminating the effects of said higher frequency movements, and means for applying said mechanical movement to the craft's rudder in additive relation to the rudder movement produced by said automatic steering system.

9. In combination with a dirigible craft, an automatic steering system adapted to produce movement of the craft's rudder proportional to the deviation of the craft from its course and in a direction to maintain said course, whereby the craft tends to travel along a substantially sinusoidal path or curve of low frequency, the extraneous influences on said craft tending to produce secondary movements thereof of higher frequency superimposed on the primary movement of the craft, a device responsive to reversals in direction of the craft's yawing motion for producing a mechanical movement substantially coincident with the peak of the yaw, means included in said device for eliminating the effects of said higher frequency movements, and means for applying said mechanical movement to the craft's rudder in additive relation to the rudder movement produced by said automatic steering system.

10. In combination with a dirigible craft, an automatic steering system adapted to produce movement of the craft's rudder proportional to the deviation of the craft from its course and in a direction to maintain said course, whereby the craft tends to travel along a substantially sinusoidal path or curve of low frequency, the extraneous influences on said craft tending to produce secondary movements thereof of higher frequency superimposed on the primary movement of the craft, an electro-mechanical device responsive to reversals in direction of the craft's yawing motion for producing a mechanical movement substantially coincident with the peak of the yaw, electrical filter means included in said device for eliminating the effects of said higher frequency movements, and means for applying said mechanical movement to the craft's rudder in additive relation to the rudder movement produced by said automatic steering system.

11. In combination with a dirigible craft, an automatic steering system adapted to produce movement of the craft's rudder proportional to the deviation of the craft from its course and in a direction to maintain said course, whereby the craft tends to travel along a substantially sinusoidal path or curve of low frequency, the extraneous influences on said craft tending to produce secondary movements thereof of higher frequency superimposed on the primary movement of the craft, means responsive to the movements of the craft for producing a variable voltage whose amplitude varies according to the craft's yaw, means responsive to said voltage reaching its maximum amplitude for producing a control action free of the effects of said higher frequency movements, and means for applying said control action to the craft's rudder in additive relation to the rudder movement produced by said automatic steering system.

12. In an automatic steering system for a dirigible craft, means responsive to the yaw of the craft for producing a variable voltage whose amplitude varies according to the craft's yaw, means including a grid-controlled electron discharge tube adapted to be triggered by said voltage only when it reaches its maximum amplitude, to produce a second voltage, means responsive to said second voltage to produce a control action, and means for utilizing said control action to steer the craft.

13. In an automatic steering system for a dirigible craft, means responsive to the yaw of the craft for producing a variable voltage whose amplitude varies according to the craft's yaw, a voltage wave generator, means responsive to said first-named voltage for controlling the action of said generator, means responsive to the generated voltage wave for producing a control action, and means for utilizing said control action to steer the craft.

14. In an automatic steering system for a dirigible craft, means responsive to the yaw of the craft for producing a pair of variable voltages whose respective maximum values are reached substantially coincident with opposing yaw peaks, a pair of voltage wave generators controlled respectively by said first-named voltages, means responsive to the generated voltage waves for producing control actions, and means for utilizing said control actions to steer the craft.

BRITTON CHANCE.